United States Patent [19]
Korth

[11] Patent Number: 5,818,424
[45] Date of Patent: Oct. 6, 1998

[54] ROD SHAPED DEVICE AND DATA ACQUISITION APPARATUS FOR DETERMINING THE POSITION AND ORIENTATION OF AN OBJECT IN SPACE

[75] Inventor: Hans-Erdmann Korth, Stuttgart, Germany

[73] Assignee: International Business Machines Corporation, Armonk, N.Y.

[21] Appl. No.: 545,063

[22] Filed: Oct. 19, 1995

[51] Int. Cl.[6] ................................................. G09G 5/08
[52] U.S. Cl. ................................. 345/158; 345/179
[58] Field of Search ................................ 345/158, 156, 345/157, 179, 145; 382/184, 312, 313

[56] References Cited

U.S. PATENT DOCUMENTS

| | | | |
|---|---|---|---|
| 4,956,794 | 9/1990 | Zeevi et al. | 364/559 |
| 5,162,781 | 11/1992 | Cambridge | 345/158 |
| 5,227,985 | 7/1993 | DeMenthon | 345/158 |
| 5,297,061 | 3/1994 | Dementhon et al. | 364/559 |
| 5,469,193 | 11/1995 | Giobbi et al. | 345/158 |

OTHER PUBLICATIONS

European Search Report 94 11 9480.

*Primary Examiner*—Lun-Yi Lao
*Attorney, Agent, or Firm*—James E. Murray

[57] ABSTRACT

A rod-shaped device for spatial data acquisition includes a shank (1) with at least two separated, substantially identical marker field structures (3, 4) on the surface of the shank (1). The marker field structures (3, 4) are resolvable for imaging purposes by an optical position and orientation determination system for determining the position and orientation of an object in space. That system includes imaging apparatus (5) with a field of vision containing the rod-shaped device to capture position data of the rod shaped device. A computer (6) connected to the image apparatus receives the position data and calculates the position and orientation of the object in space.

18 Claims, 2 Drawing Sheets

ROD SHAPED DEVICE AND DATA ACQUISITION APPARATUS FOR DETERMINING THE POSITION AND ORIENTATION OF AN OBJECT IN SPACE

FIELD OF THE INVENTION

The invention relates to a rod-shaped device for spatial data acquisition and to an optical position and orientation determination system for determining the position and orientation of an object in space. It also relates to a method for determining the six degrees of freedom for position and orientation of an object in a three-dimensional space.

BACKGROUND OF THE INVENTION

Computer input for complex manipulation tasks requires specialized equipment to monitor the hand and finger motions. This equipment may impede the manipulation operation. High costs restrict use of such equipment to specialized purposes while the common manual interface with a computer is done via keyboard and mouse. It is however difficult to move a mouse over small distances because of its size and structure. Further, it is impossible to monitor those movements of the mouse directly and it is very difficult to enter small figures through the mouse.

An object in a three-dimensional space has a total of six degrees of freedom, three for position and three for orientation. There is a wide range of applications where it is necessary to obtain both translational and rotational information of an object in space. Minimal invasive surgery, for example, allows to observe the operation area with an endoscopic camera. For the surgeon, accurate visual information about the placement and direction of its operation tools is essential.

Manipulation with remote or miniaturized tools requires exact feedback about the location and orientation of the tool. The generation of stereoscopic image pairs is expensive and not always feasible. Moreover, the translation of stereo pairs into useful input for computers and for persons without stereoscopic viewing capability is rather complex.

The prior art has accomplished these tasks by using a variety of optical systems. Video cameras, light sources and the combination of light emitting diodes and photoreceptors have been employed.

U.S. Pat. No. 4,744,664 discloses a system for locating a feature of an object disposed in a frame. A spot projector, typically a laser, projects the spot towards a preselected location on the frame. When the spot and the feature are in the field of view of the imaging device, typically a video camera, the absolute location of the feature is determined from its selective distance to the spot. The exact position of the spot is known with great accuracy and the location of the feature is determined by measuring the relative distance between the part to the spot as seen by the camera. This solution needs a frame for holding the object and light pattern projecting means for projecting a spot to a known location of the field of view.

In U.S. Pat. No. 4,396,945 a method of sensing the position and orientation of an element such as a platform in space by determining the intersection of a line with a plane or with another line is described. This method requires a plurality of non-columnar light sources on an element which is movable in space and a pair of cameras at positions spaced from the element.

The graphics system of U.S. Pat. No. 5,239,292 comprises a pen-like input device, a computer for detecting the changes in the position of the input device relative to a surface and a monitor for displaying patterns which follow the movement of the input device. To control the displayed pattern, the velocity and acceleration of the input device are detected and used. This solution allows visual feedback of the dynamic behavior of the input device and simulates the effect of painting on a surface. This arrangement needs a well-defined surface whereon a pattern is drawn with the input device.

The pen-type computer input device comprising a shank with a tip end and a pen nib on the tip end of U.S. Pat. No. 5,159,321 is used to move a cursor on the display of a computer system or to enter data such as figures, letters, numerals or the like into a computer system to which the input device is connected. In the shank of the input device there are sensor means disposed for detecting the directions in which and the distances by which the pen nib moves in two perpendicular directions in a plane. For example, a free curve which may represent any figure, letter, numeral or symbol has to be drawn on a recording sheet by the pen-type input device and the input device has to be connected to a computer system.

U.S. Pat. No. 4,956,794 discloses a head position detector with a cue device mounted on the head being monitored to be detected by a camera providing an indication of head position to a host computer.

U.S. Pat. No. 5,297,061 discloses a computer vision system that monitors an illuminated pointing device with light sources to allow an operator to control virtual three dimensional objects on the display of a computer.

BRIEF DESCRIPTION OF THE INVENTION

In accordance with the present invention, a new tool for spatial data acquisition and a system and method using the tool are provided. The tool is a pen or rod-shaped device with at least two separated, unique marker field structures on the surface of its shank: The system includes the pen; an optical position and orientation determination system with camera image acquisition means capable or resolving the marker field structures of the pen for measuring position data of the pen; and computer means connected to the image acquisition means for receiving the measured data and for calculating the position and orientation of the pen in space, e.g. the orientation of the pen and the location of its tip end.

Using the pen, the placement of an object can be analyzed from its camera image for translation, X-axis and Y-axis, and for rotation with respect to the optical axis, yaw-angle $\phi$. Information about the remaining Z translation, the pitch angle $\psi$ and the roll angle X may be extracted from a prior information about the object, e.g. its apparent size within the camera image.

The pen or rod-shaped device of the invention with the marker field structure allows a highly precise determination of all those six position parameters. It is especially well suited to monitor the location of rod-shaped objects like pens, pointers, wrenches, screwdrivers and other different kinds of tools. It may be used as input device for computers for complex manipulation tasks and for training purposes within a virtual reality environment.

The present invention allows the input of real-time tool handling data to an application program. Several tools can be controlled simultaneously and complex manipulations can be done in virtual reality environments. Monitoring the handling of tools allows feedback for operator training, especially for control of the micro-motoric performance. Remote tools can be displayed with three-dimensional information. Probing an object with the tool allows to transfer three-dimensional information about the object's surface.

Accurate dimensional measurements can be done with a minimum of hardware from the sub-millimeter to the hectometer range. The three-dimensional information can be presented to computer users lacking stereoscopic sight, e.g. by appropriate location and tilt dependent shading within a space grid.

Therefore, it is an object of the present invention to provide a six degree of freedom device for data acquisition which solves the problems cited above, which is less costly and which may easily be handled.

It is a further object to provide an optical position and orientation determination system and a method for determining the position and orientation of an object in space which is simple and may easily be handled.

BRIEF DESCRIPTION OF THE DRAWINGS

The above and other objects, features and advantages of the invention can best be understood by reference to the accompanying Figures of which.

DETAILED DESCRIPTION

Figure 1:
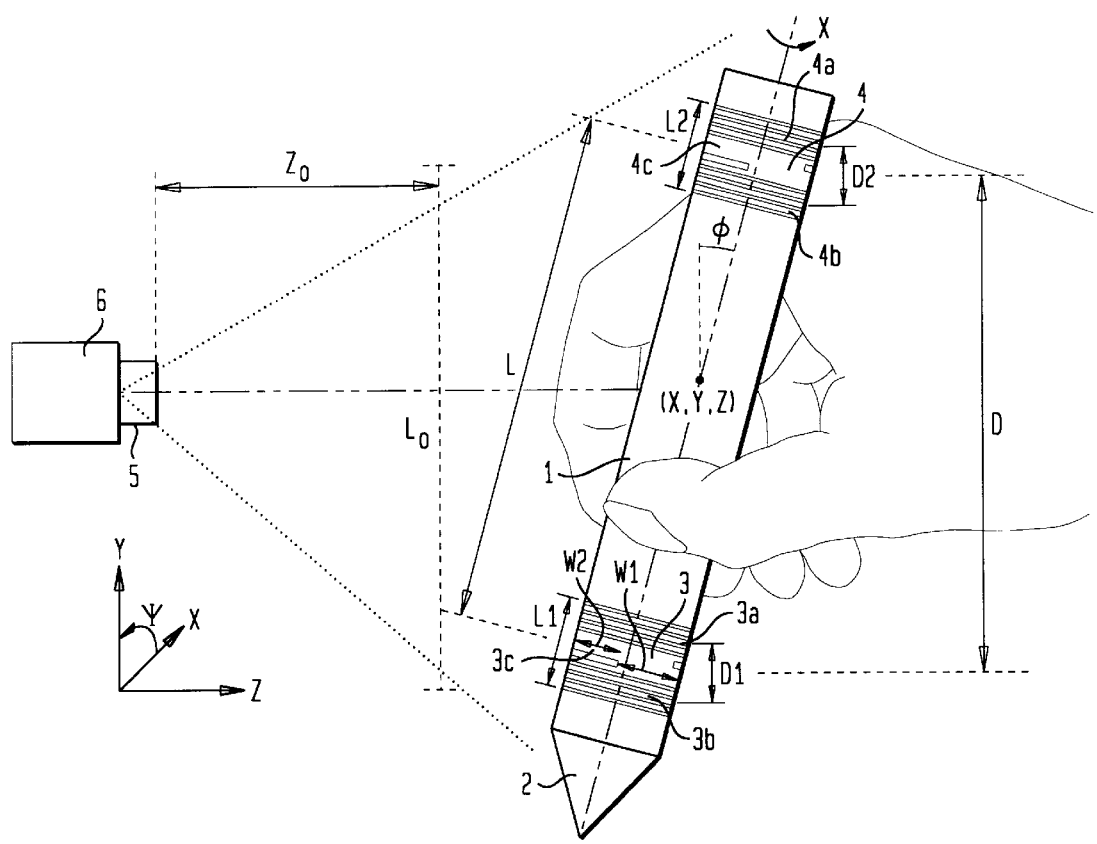
FIG. 1 is schematic of the present invention in use.

FIG. 1 shows an arrangement with imaging means 5 attached to a computer system 6 that observes a scene with a rod-shaped device comprising a shank 1 with a tip end 2. The device is manipulated by an operator for spatial data acquisition. On the surface of the shank 1 there are placed two separated marker field structures 3,4 which are substantially identical and which have the lengths L1 and L2.

The marker field structures have to be visible to the imaging means 5. Shading of one marker field structure leads to the loss of the Z, pitch, and yaw-information. A temporary shading may however be acceptable when inertia is assumed for extrapolation.

The marker field structures have to be resolvable for the imaging means 5, that means that they must be larger than the pixel size.

The marker field structures should contain a maximum of information to allow position averaging and defect compensation processing. There may be more than two marker fields placed on the surface of the shank for purposes where this seems appropriate, for critical applications, e.g. to obtain more detailed position and orientation data of the device with increased accuracy.

A sufficient depth-of-focus is also required for the working space.

In FIG. 1 each of the at least two separated marker field structures 3,4 with the lengths L1 and L2 comprises one or more identical line grid patterns 3a, 3b and 4a, 4b, respectively.

These simple line grid patterns can be detected easily by image processing techniques. The center of a line grid pattern can be located very accurately. Assuming that the transition between a dark line and a bright line can be located within $1/10$ of a pixel and that a line grid pattern with 100 resolvable transitions may be averaged, then a location precision of $1/100$ pixel can be expected. With a marker field structure composed from two line grid patterns and the centers of the grid patterns being separated by some 20 pixels, the apparent size of the marker field structure can be determined to less than $1/1000$.

The center of a grid pattern is defined as the center of gravity of the dark and bright lines and may be calculated by known algorithms from the structure of the grid pattern.

The area in between the line grid patterns 3a, 3b and 4a, 4b may be used for roll angle $\chi$ sensing structures. This area comprises a sequence of bright and dark sectors or quadrants 3c, 4c. In contrast to the circumferential and closed dark and bright lines of the line grid patterns 3a, 3b the sectors 3c, 4c are not circumferential and have the widths W1 and W2. This is the reason why they may be used for determining the rotation axis with the roll angle $\chi$, whereas the circumferential lines are completely independent from the rotation axis of the rod-shaped device.

In the area between the line grid patterns there may be additional structures which will allow to determine the absolute roll angle. Slightly different structures, that is e.g. a different sequence of not circumferential bright and dark sectors 3c, 4c, in the at least two separated and substantially identical marker field structures 3,4 will allow to differentiate between the at least two marker fields, that is to determine which one of the marker fields is at the top and which one is at the bottom of the rod-shaped device.

In a preferred embodiment the geometrical lengths of the marker field structures are chosen so that the distance L between the centers of the at least two separated marker field structures 3,4 is greater than the lengths L1 and L2 of the two separated marker field structures 3,4 and greater than the widths W1 and W2 of the bright and dark sectors 3c, 4c.

The optical position and orientation determination system for determining the position and orientation of an object in space shown in FIG. 1 comprises a rod-shaped device as described above and imaging means 5 with a field of vision containing the rod-shaped device. The imaging means have image acquisition means like a video camera 5 for measuring position data of said device and computer means 6 connected to the image acquisition means for receiving the measured data and for calculating the position and orientation of the object in space.

For determining the position and orientation of an object in space with the optical position and orientation determination system the length of the object, or better, the always constant distance L between the centers of the marker field structures 3,4 must be known.

The marker field centers are defined to be the common center of gravity of the line grid patterns 3a, 3b and the sector 3c and of the line grid patterns 4a, 4b and the sector 4c. The coordinate information about the position of the marker field centers (X1,Y1) and (X2,Y2) of the device or object can be extracted by straight-forward algorithms. By averaging marker field structures with hundred or more resolvable bright/dark transitions a high location precision of the X- and Y-coordinates of the marker field centers may be expected.

The pitch angle $\psi$ defining the inclination of the imaging plane is calculated from $\tan \psi = (Y2-Y1)/(X2-X1)$.

After extracting the visible distance D between the centers of the at least two separated marker field structures 3,4 or the apparent object length, the visible distances D1 between the centers of the two identical line grid patterns 3a, 3b of marker field structure 3 and the visible distance D2 between the centers of the two identical line grid patterns 4a, 4b of marker field structure 4 the yaw angle $\phi$ can be calculated from $\tan \phi = 2 D/L \times (D2-D1)/(D2+D1)$.

Assuming an accuracy of $1/1000$ for D1 and D2, the value obtained for $\phi$ should be accurate within a milliard.

The roll angle $\chi$ can be calculated from the ratio of the widths W1 and W2 of the bright and dark sectors 3c, 4c of the roll detection pattern in the area in between the line grid patterns 3*a*, 3*b* and 4*a*, 4*b* from $\sin\chi = (W2-W1)/(W2+W1)$.

The coordinates X and Y of the center between the at least two separated marker field structures 3,4 may easily be calculated.

To determine the coordinate Z of the center between the at least two separated marker field structures 3,4 a reference plane at a distance Zo from the imaging means, typically a video camera, has to be determined. The length Lo then is the measured length L at Zo when $\phi=0$.

To calibrate the camera, the angle between light beams from the center of the lens to neighboring pixel sensors must be known. This allows to determine the reference plane at a distance Zo from the camera, where the length unit will be defined with respect to the pixel distance.

Now the coordinate Z of the center between the at least two separated marker field structures 3,4 can be calculated from $Z = Zo \times Lo/D \cos\phi$.

Assuming some 100 pixel-widths for Lo and a marker location accuracy of 1/100 pixel, this means that from a camera distance of 1 m the Z-position of the center between the two marker field structures can be determined within 0.1 mm.

Figure 2:
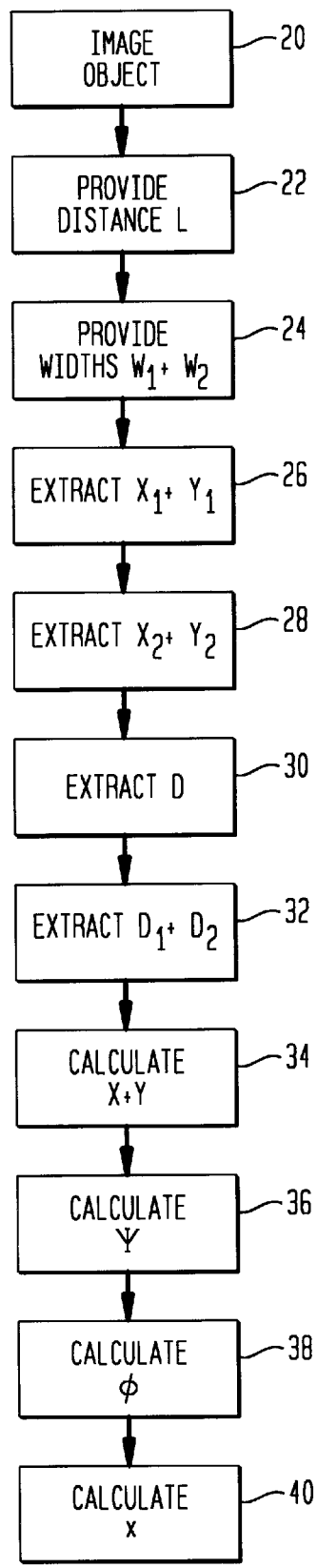
FIG. 2 is a flow diagram for calculating the six position parameters in accordance with the present invention.

Thus, as shown in FIG. 2, the method of determining the position and orientation of an object in space with the optical position and orientation determination system comprises the steps imaging the rod-shaped device with spaced makers having light and dark sectors 20;

providing the distance L between the centers of the at least two separated marker field structures 22;

providing the widths WI and W2 of the bright and dark sectors 24;

extracting the position data (X1,Y1) of the center of the first marker field structure 26;

extracting the position data (X2,Y2) of the center of the second marker field structure 28;

extracting the visible distance D between the centers of the at least two separated marker field structures 30;

extracting the visible distances D1 and D2 between the centers of the identical line grid patterns of each marker field structure 32;

calculating the coordinates X and Y of the center between the at least two separated marker field structures 34;

calculating the pitch angle $\psi$ 36;

calculating the yaw angle $\phi$ 38; and calculating the roll angle $\chi$ 40.

The disclosed optical position and orientation determination system for determining the position and orientation of an object in space with the rod-shaped device for spatial data acquisition is sufficient to generate complete three-dimensional information within a computer and opens a realm of novel computer applications.

The above described embodiment is illustrative of the present invention. Various changes and modifications can be made in this embodiment by those skilled in the art which fall in the spirit and scope of the invention.

What I claim is:

1. A rod-shaped device for spatial data acquisition comprising a shank with a tip end, with at least two separated non-emitting marker field structures on the surface of said shank, said marker field structures being resolvable by imaging means for measurement of both the length and orientation of said rod-shaped device.

2. A rod-shaped device for spatial data acquisition comprising a shank with a tip end, with at least two separated marker field structures on the surface of said shank, said marker field structures being resolvable by imaging means for measurement of both the length and orientation of said rod-shaped device wherein, each of said at least two separated marker field structures includes two spaced sets of one or more identical line grid patterns, said line grid patterns containing a defined number of circumferential bright and dark lines.

3. The rod-shaped device of claim 2 wherein:

each of said at least two separated marker field structures further comprises a sequence of non-circumferential bright and dark sectors between the two spaced sets.

4. The rod-shaped device of claim 3 wherein:

each of said at least two separated marker field structures includes a different sequence of said non-circumferential bright and dark sectors.

5. The rod-shaped device of claim 3 wherein;

the distance L between the centers of said at least two separated marker field structures is greater than the lengths L1 and L2 of said two separated marker field structures and greater than the widths W1 and W2 of said bright and dark sectors.

6. An optical position and orientation determination system for determining the position and orientation of an object in space comprising:

a rod-shaped device with at least two separated marker field structures on the surface thereof along the length of the rod-shaped device, said marker field structures being resolvable by imaging means, wherein said at least two separated sets of marker field structures includes grid line pattern having a number of circumferential bright and dark lines on the surface of said rod-shaped device, said marker field structures being resolvable for measurement of both the length and orientation of said rod shaped device;

imaging means having a field of vision containing said rod-shaped device, said imaging means having image acquisition means for measuring position data of said device using said separated marker field structures; and computer means connected to said imaging means for receiving said measured data and for calculating the position and orientation of said object in space.

7. The optical position and orientation determination system of claim 6 wherein said rod-shaped device includes at least two separated sets of marker field structures on the surface of said shank, said marker field structures being resolvable by imaging means for measurement of both the length and orientation of said rod-shaped device.

8. The optical position and orientation determination system of claim 6 wherein:

each of said at least two separated sets of marker field structures further comprises a sequence of non-circumferential bright and dark sectors.

9. The optical position and orientation determination system of claim 8 wherein:

each of said at least two separated marker field structures includes a different sequence of said non-circumferential bright and dark sectors.

10. The optical position and orientation determination system of claim 9 wherein:

the distance L between the centers of said at least two separated sets of marker field structures is greater than the lengths L1 and L2 of said two separated sets of marker field structures and greater than the widths W1 and W2 of said bright and dark sectors.

11. The optical position and orientation determination system of claim 10, wherein said imaging means comprises a video camera.

12. A method for determining the position and orientation of an object in space with an optical position orientation determination system comprising the steps of:

imaging a rod-shaped device with at least two separated marker field structures along its length each separated marker field structure having bright and dark sectors;

providing a distance L along the rod-shaped device between the centers of said at least two separated marker field structures;

providing a widths W1 and W2 to said bright and dark sectors of the marker field structure;

extracting position data (X1, Y1) of the center of the first marker field structure;

extracting position data (X2, Y2) of the center of the second marker field structure;

extracting the visible distance D between the centers of said at least two separated marker field structures;

extracting the visible distances D1 and D2 between the centers of the identical line grid patterns of each marker field structure;

calculating the coordinates X and Y of the center between said at least two separated marker field structures;

calculating the pitch angle $\psi$; calculating the yaw angle $\phi$; and calculating the roll angle $\chi$.

13. The method of claim 12 wherein said imaging the rod-shaped device comprises:

defining a reference plane at a distance Zo from an imaging means; and defining the visible distance Lo between the centers of said at least two separated marker field structures at said defined distance Zo.

14. The method of claim 13 further comprising calculating the coordinate Z of the center between said at least two separated marker field structures.

15. A method for determining the position and orientation of an object in space with an optical position orientation determination system comprising the step of:

imaging a rod-shaped device with at least two separated marker field structures along its length each separated marker field structure having bright and dark sectors at the center of the marker field structures;

providing a distance L along the rod-shaped device between the centers of said at least two separated marker field structures which distance L is longer than the lengths L1 and L2 of the marker field structures;

providing widths W1 and W2 for said bright and dark sectors of the marker field structure;

extracting from the image position data (X1, Y1) for the center of the first marker field structure;

extracting from the image position data (X2, Y2) for the center of the second marker field structure;

extracting the visible distance D between the centers of said at least two separated marker field structures;

extracting the visible distance D1 and D2 between the centers of the identical line grid patterns of each marker field structure;

calculating the coordinates X and Y of the center between said at least two separated marker field structures;

calculating the pitch angle $\psi$;

calculating the yaw angle $\phi$; and calculating the roll angle $\chi$.

16. The method of claim 15 wherein said imaging the rod-shaped device comprises:

defining a reference plane at a distance Zo from an imaging means; and defining the visible distance Lo between the centers of said at least two separated marker field structures at said defined distance Zo.

17. The method of claim 16 further comprising calculating the coordinate Z of the center between said at least two separated marker field structures.

18. An optical position and orientation determination system for determining the position and orientation of an object in space comprising:

a rod-shaped device with at least two separated reflective marker field structures on the surface thereof along the length of the rod-shaped device, said marker field structures being resolvable by imaging means;

imaging means having a field of vision containing said rod-shaped device, said imaging means having image acquisition means for measuring position data of said device using said separated marker field structures; and computer means connected to said imaging means for receiving said measured data and for calculating the position and orientation of said object in space.

* * * * *